United States Patent Office 3,538,057
Patented Nov. 3, 1970

3,538,057
BASIC DYEABLE POLYESTER POLYMERS CONTAINING A METAL SALT OF A CYCLOALKYL SULFONATE
Lorin G. Lafoe, Fullerton, Calif., assignor to Fiber Industries, Inc., a corporation of Delaware
No Drawing. Continuation-in-part of application Ser. No. 581,762, Sept. 26, 1966. This application Mar. 27, 1969, Ser. No. 811,223
Int. Cl. C08g *17/08;* D06p *3/52;* D06m *13/28*
U.S. Cl. 260—75                          5 Claims

ABSTRACT OF THE DISCLOSURE

A terephthalate polyester polymer of improved dyeability containing minor amounts of a metallized salt of an organic sulfonate having the formula:

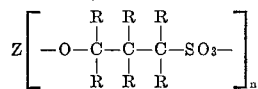

wherein $n$ is an integer of 1 and 2; when $n=1$, Z is a cycloalkyl radical, substituted derivative of said cycloalkyl radical wherein the substituent is hydroxy, alkyl or alkoxy; when $n=2$, Z is a cycloalkylene radical, substituted derivatives of said cycloalkylene radical wherein the substituents are hydroxy, alkyl or alkoxy; R, individually, is hydrogen or alkyl radical containing from 1 to 6 carbon atoms.

---

This invention which is a continuation-in-part application of co-pending application Ser. No. 581,762, filed Sept. 26, 1966, now abandoned, relates to compositions and shaped articles made therefrom of improved dyeability and consisting of linear thermoplastic polymers, novel cycloalkyl sulfonates useful therein and the process of producing same.

Successful methods have been suggested in the past to improve the dyeability of shaped articles made from synthetic polymers such as fibers, fabrics or films specially utilizing basic dyes to provide brighter colors and also to permit cross dyeing of the articles. These methods utilize the techniques of incorporating sulfonated monomers into synthetic polymers such as polyester, nylon, polypropylene and the like to provide copolymers. Typical of this procedure is U.S. 3,018,272 which describes the process of producing basic dyeable polyesters having incorporated therein as comonomers sulfonated monomers. In the prior art, the use of sulfonated monomers to form copolymers with polyester is considered essential. If sulfonated monomers which do not form copolymers with polyesters are employed, the resulting fibers and films formed from these heterogeneous mixtures do not permit uniform dyeing.

It has now been discovered that certain cycloalkyl sulfonates may be successfully utilized in improving the basic dye uptake of linear thermoplastic polymers. Specifically, it has been found that these linear thermoplastic polymers containing cycloalkyl sulfonates which dissolve in the synthetic linear polymers can be shaped into highly desirable fibers and films having permanent and uniform basic dye uptake sites throughout the shaped article. This is indeed an unexpected development since heretofore it was not known that organic sulfonates would dissolve in linear thermoplastic polymers.

The selection of appropriate cycloalkyl sulfonates involves the use of a test procedure with which suitable cycloalkyl sulfonates may be determined. The selected cycloalkyl sulfonate is blended with the monomers of the specific polymer, e.g. for polyesters, bis(2-hydroxyethyl) terephthalate, or alternatively may be blended with the partially polymerized polymer or after the polymer is formed. A suitable test procedure for determining solubility in the polymer of a cycloalkyl sulfonate in the form of a meal salt is the use of a chloroacetic extraction technique on the polymer containing the sulfonate.

Prior to the extraction procedure a sulfur analysis is made of the polymer containing the metal containing organic sulfonate. A specific amount of polymer is then exposed to warm chloroacetic acid, using a typical extraction procedure. In general, at least two extractions are used. The chloroacetic acid will extract the soluble metal containing organic sulfonate to remove approximately 90 percent of the soluble material from the polymer after the second extraction. This can be determined by a sulfur analysis of the extracted polymer. If the cycloalkyl sulfonate is insoluble in the polymer, the polymer can be visually observed to be heterogeneous in view of the presence of insoluble material.

On dyeing the shaped structure with the desirable basic dye, the soluble metal containing cycloalkyl sulfonate is reacted with the dye in the polymer making the sulfonate unextractable. Obviously then, in determining solubility, the sulfonate-containing polymer should be in the form of the polymer prior to shaping the polymer into a fiber or filament.

Those sulfonates which dissolve in the polymer to the extent of at least 0.5 weight percent based on the polymer are, for the purpose of this invention, to be considered soluble. Preferably, the sulfonates should be soluble to the extent of about 8 weight percent for best results.

A preferred class of cycloalkyl sulfonates are metallized salts of linear thermoplastic polymer-soluble sufonates of the following formula:

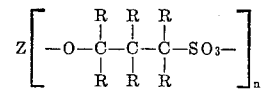

wherein $n$ is an integer of 1 and 2; when $n=1$, Z is a cycloalkyl radical, or substituted derivative of said cycloalkyl radical wherein the substituent is hydroxy, alkyl or alkoxy; when $n=2$, Z is a cycloalkylene radical, or substituted derivatives of said cycloalkylene radical wherein the substituent is hydroxy, alkyl or alkoxy; R, individually, is hydrogen or alkyl radical containing from 1 to 6 carbon atoms.

More preferably the cycloalkyl sulfonates are compounds of the following formula:

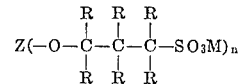

wherein Z is cycloalkyl, substituted derivatives thereof in which the substituents include hydroxy, alkyl or alkoxy groups; R, in each instance, represents a hydrogen or alkyl radical; M is an alkali metal, preferably sodium, potassium or lithium; and $n$ has a value of at least 1 and preferably not greater than 2. Of course, in compounds where $n$ is greater than one, Z is appropriately a di, tri or polyvalent radical. For example, where $n$ is 2, Z is cycloalkylene.

The preferred novel class of sulfonated aliphatic compounds of this invention can be prepared by the reaction of sultone and the cycloalkyl alcohol having the formula:

wherein $n$ is an integer of 1 and 2; where $n=1$, Z is a cycloalkyl radical, substituted derivative of said cycloalkyl radical wherein the substituent is hydroxy, alkyl and alkoxy; when $n=2$, Z is a cycloalkylene radical, substitute derivatives of said cycloalkylene radical wherein the substituents are hydroxy, alkyl and alkoxy.

Compounds illustrative of the polymer-soluble cycloalkyl sulfonates include:

(3-potassium sulfopropoxy) cyclohexane;
(3-sodium sulfopropoxy) cyclopentane;
1-(3-sodium sulfopropoxy)-4-methyl cyclohexane;
1-(3-sodium sulfopropoxy)-3-hexylcyclohexane;
2-(3-sodium sulfopropoxy)-bicycloheptane;
1-hydroxy-4-(3-lithium sulfopropoxy) cyclohexane;
1-hydroxy-2-(3-potassium sulfopropoxy) cyclohexane;
1-hydroxy-3-(3-sodium sulfopropoxy) cyclopentane;
1,3-dihydroxy-5-(3-sodium sulfopropoxy) cyclohexane;
1,4-bis(3-lithium sulfopropoxy) cyclohexane;
1,2-bis(3-sodium sulfopropoxy) cyclohexane;
1,3-bis(3-sodium sulfopropoxy) cyclopentane;
1,3-bis(3-potassium sulfopropoxy) bicycloheptane;
1-hydroxy-3,5-bis(3-sodium sulfopropoxy) cyclohexane;
2-hexyl-1,4-bis(3-sodium sulfopropoxy) cyclohexane;
4-methyl-1,2-bis(3-lithium sulfopropoxy) cyclopentane;
1,4-bis(3-sodium sulfopropoxymethyl)cyclohexane and the like.

The novel class of sulfonated cycloalkyl compounds of this invention are prepared by heating at least equimolar quantities of the alcohol corresponding to radical Z in the formula, $Z(OH)_n$ (previously defined) with sultones in the presence of alkali hydroxides preferably at temperatures in the range from about 30° C. to about 150° C. to produce the class of sulfonated compounds described. Typical cycloalkyl alcohols are, among others, hydroxycyclohexane;
hydroxycyclopentane;
1-hydroxy-4-methylcyclohexane;
1-hydroxy-3-hexylcyclohexane;
2-hydroxy-bicycloheptane;
1,4-cyclohexane dimethanol;
1,4-dihydroxycyclohexane;
1,2-dihydroxycyclohexane;
1,3-dihydroxycyclopentane;
1,4-dihydroxybicycloheptane;
1,3,5-bihydroxycyclohexane;
1,4-dihydroxy-3-hexylcyclohexane;
1,4-dihydroxy-3-methylcyclohexane;
1,2-dihydroxy-4-hexoxycyclohexane and
1,2-dihydroxy-4-methylcyclopentane.

The sultones which are reacted with the trihydric type alcohols can be described generically in the following formula:

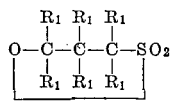

wherein $R_1$, individually, represents hydrogen or alkyl radicals containing from 1 to 6 carbon atoms. Suitable sultones include, among others: 1,3-propane sultone; 1,3-butane sultone; 1,3-isohexane sultone; 1,3-hexane sultone and the like.

The alkali hydroxides suitable for use in the process herein preferably include sodium hydroxide, potassium hydroxide and lithium hydroxide. The alkali hydroxides in some cases are used preferably in an excess of organic vehicle or medium, preferably benzene, toluene, orthoxylene, meta-xylene, para-xylene, mixtures thereof and the like to permit azeotropic distillation of the water produced in the reaction to prevent the reaction from reversing.

The temperature conditions utilized in preparation of the novel aliphatic sulfonated compounds of this invention range from about 30° C. to about 150° C., preferably from 50° C. to 120° C. The reaction can be carried out at atmospheric pressure, superatmospheric pressures or subatmospheric pressures as is convenient.

The surprising feature of the novel cycloalkyl sulfonated compounds of this invention is the solubility in synthetic linear polymers such as polyethylene terephthalate.

The new compositions of the present invention, i.e., containing the soluble sulfonated compounds and polymerized synthetic linear polymers, are useful in the production of shaped articles by extrusion, molding, casting or the like. These shaped articles in turn may be formed into fibers (filaments and staple), fabrics, ornaments, films or the like.

The presence of soluble sulfonated compounds in the synthetic linear polymers is to provide dye sites especially for basic dyes. It is usually desirable to use at least about 0.5 weight percent of the sulfonate salt based on the total mixture. Polymer mixtures having a sulfonated salt content lower than 0.5 weight percent will usually have only a relative low affinity for basic dyes. Polymer mixtures containing about 10 weight percent of the sulfonated compound have a very high affinity for basic dyes. Higher concentrations will not lead to appreciable increases in basic dyeability and in general may unduly affect tenacity in the shaped articles. The sulfonated compound concentrations in the range from 2 to 8 weight percent of the total mixture, are preferred.

The term "linear thermoplastic polymer" as used herein includes polymeric polymethylene terephthalates, especially preferred is polyethylene terephthalate. Other polymers which can be included herein are polyalkylene terephthalate containing modifiers such as dibasic acids including among others; isophthalic acid, sebasic acid, adipic acid and the like. Cyclic glycols can also be substituted for the alkylene glycols in the linear terephthalate polymers. Other polymers included herein are polyamides such as polyhexamethylene adipamide, polyhexamethylene sebacamide, polytetramethylene sebacamide, polytetramethylene adipamide and the like. Other polyamides include those prepared from di(4-amino-cyclohexyl) ethane or 1,6-(4-aminocyclohexyl) hexane as the diamine components. Additional polymers include polypropylene, polybutenes and the like. As is known, the intrinsic viscosities of the above-described polymers should be in excess of 0.2, preferably in the range from 0.4 to 1.0 when used for producing textile and industrial products.

Various other materials may be present in the present new compositions. For example, such ester exchange catalyst as salts of calcium, magnesium, manganese and the like and such polymerization catalysts as antimony oxide, antimonic acid or the like, may be used. In addition, pigments, delusterants, or other additives such as titanium dioxide or barium carbonate may be employed.

The yarns or filaments produced in accordance with the present invention are suitable for the usual textile applications. They may be employed in the knitting or weaving of fabrics of all types as well as in the production of nonwoven, felt-like products produced by known methods. Their physical properties closely parallel those of their related non-modified polymer fibers. However, they have particular sensitivity toward basic dyes. By a "basic dye" is meant a colored cationic organic substance such as those containing sulfonium, oxonium or quaternary ammonium functional groups. Among the basic types which may be applied to the filaments formed in accordance with the present invention may be mentioned Victoria Green WB (C.I. 657); Thodiamine B (C.I. 749); Brilliant Green B (C.I. 662); Victoria PureBlue BO (Pr 198); Sevron Blue B; and the like. The dyes are preferably applied from an aqueous solution at a temperature between 80° C. and 125° C.

Filaments and films, e.i. shaped structures which have at least one dimension relatively vary small and at least one dimension relatively large, are the preferred structures of the present invention. Such structures of the polymer mixtures of this invention are permeated uniformly throughout by basic dyes applied from hot aqueous solution. The penetration of dyes is an important characteristic since poor resistance of fading and loss of color through rubbing or abrasion is a known characteristic of structures which retain dye only at their surfaces.

The following examples will serve to illustrate the invention:

EXAMPLE I

To a one liter three-necked flask equipped with a mechanical stirrer, thermometer and Dean-Stark trap is added 144 grams (1.0 mole) of 1,4-cyclohexanedimethanol, 115 milliliters xylene and 115 milliliters toluene. To the solution in the reaction flask was added a solution of 82.4 grams (2.0 mole) of 97 percent sodium hydroxide in 80 milliliters of distilled water. The rapidly stirred mixture was heated to reflux and the theoretical amount of water was collected in 3.5 hours. The initial pot temperature was 111° C. and the final pot temperature was 122° C. To the cooled suspension of the di 1,4-bis(sodium methoxy) cyclohexane in xylene-toluene was added a solution of 122 grams of 1,3-propane sultone in toluene. The mixture was heated to about 65° C. and an exothermic reaction took place. The reaction mixture was allowed to stand for three days. The solid product 1,4-bis(3-sodium sulfopropoxymethyl) cyclohexane was collected by fiiltration, washed with ethanol and dried in a vacuum oven at 80° C. overnight. The product weighed 184 grams and had a melting point of 300° C. Infrared analysis confirm the structure of 1,4-bis(3-sodium sulfopropoxymethyl)cyclohexane.

In a similar manner as the above example, 1,4-dihydroxy-cyclohexane and 1,2-dihydroxycyclopentane can be substituted for 1,4-cyclohexanedimethanol while 1,3-butane soltone and 1,3-isohexane sultone can be substituted for 1,3-propane sultone.

EXAMPLE II

To a 500 milliliter three-necked flask equipped with stirrer, nitrogen inlet and distillation head are added 20.58 grams of 1,4-bis(3-sodium sulfopropoxymethyl) cyclohexane dissolved in ethylene glycol, 0.25 grams antimonic acid, 2 grams trimethylphosphite, 1.87 grams titanium dioxide and 750 grams of bis(2-hydroxyethyl) terephthalate. The flask was flushed three times with nitrogen, then heated to 227° C. at which temperature all the material had melted to form a clear solution. The temperature was increased slowly over a period of one hour to 280° C. The pressure was then slowly lowered by means of a vacuum pump to 0.10 mm. Hg pressure while the temperature was increased to 290° C. The polymerizing mixture was stirred at 290° C. and 0.10 mm. Hg pressure for one hour. At the end of this period, the vacuum was released and the polymer allowed to cool. The recovered polymer had an intrinsic viscosity of 0.6019 determined in a mixture of 58.8 parts phenol and 41.2 parts trichlorophenol and a crystalline melting point of 238° C. The polymer mixture contained polyethylene terephthalate and 1,4-bis(3-sodium sulfopropoxymethyl) cyclohexane. A portion of the polymer was placed in chloroacetic acid wherein approximately 90 percent of the 1,4-bis(3-sodium sulfopropoxymethyl) cyclohexane was removed in two abstractions.

The polymer was spun into fibers at 285° C. from a melt index apparatus and the fibers obtained oriented by stretching at least 3 times the spun yarn over a surface heated at 80° C. A sample of the oriented fiber was dyed in a Sevron Blue B basic dye bath for one hour at 90° C. The fibers dyed to a deep shade of blue having good washfastness properties.

In a similar manner as above polyhexamethylene adipamide can be substituted for the polyethylene terephthalate.

What is claimed is:

1. A composition of improved dyeability comprising a linear fiber and film-forming terephthalate polyester polymer and from about 0.5 percent by weight to about 10 percent by weight based on the total composition of an organic sulfonate in the form of a metal salt having the formula:

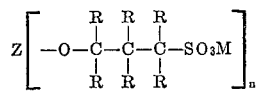

wherein $n$ is an integer of 1 or 2; when $n=1$, Z is a cycloalkyl radical or substituted derivative of said cycloalkyl radical wherein the substituent is hydroxy, alkyl or alkoxy; when $n=2$, Z is a cycloalkylene radical or substituted derivatives of said cycloalkylene radical wherein the substituent is hydroxy, alkyl or alkoxy; R, individually, is hydrogen or alkyl radical containing from 1 to 6 carbon atoms and M is an alkali metal.

2. The composition of claim 1 wherein the linear thermoplastic polymer is polyethylene terephthalate.

3. The composition of claim 2 wherein the organic sulfonate is soluble in the polymer to form a homogeneous polymer.

4. The composition of claim 3 wherein the sulfonate is 1,4-bis(3-sodium sulfopropoxymethyl) cyclohexane.

5. A polyethylene terephthalate polymer in the form of a fiber or film containing 1,4-bis(3-sodium sulfopropoxymethyl) cyclohexane in amounts ranging from about 2 weight percentage to about 8 weight percentage based on the total mixture.

References Cited

UNITED STATES PATENTS 3,018,272   1/1962   Griffing et al.
3,432,472   3/1969   Caldwell.

HAROLD D. ANDERSON, Primary Examiner

L. P. QUAST, Assistant Examiner

U.S. Cl. X.R.
8—55, 100; 260—78, 93.7, 503